US009037410B2

(12) United States Patent
Ferro et al.

(10) Patent No.: US 9,037,410 B2
(45) Date of Patent: May 19, 2015

(54) METHOD AND DEVICE FOR CREATING AN AIRCRAFT FLIGHT PLAN

(75) Inventors: Daniel Ferro, Muret (FR); Veronique Roan, Tournefeuille (FR); Philippe Haas, Toulouse (FR); Fulgence Rollet, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 588 days.

(21) Appl. No.: 12/253,634

(22) Filed: Oct. 17, 2008

(65) Prior Publication Data

US 2009/0105943 A1    Apr. 23, 2009

(30) Foreign Application Priority Data

Oct. 19, 2007 (FR) ...................................... 07 07327

(51) Int. Cl.
*G01C 21/00* (2006.01)
*G01C 23/00* (2006.01)
*G08G 5/00* (2006.01)

(52) U.S. Cl.
CPC .............. *G01C 23/005* (2013.01); *G08G 5/003* (2013.01); *G08G 5/0039* (2013.01); *G08G 5/0034* (2013.01)

(58) Field of Classification Search
CPC ... G08G 5/0034; G08G 5/0039; G08G 5/003; G01C 23/005
USPC ............... 701/1, 3, 14, 25, 26, 201, 202, 206, 701/533; 244/1 R; 340/971
See application file for complete search history.

(56) References Cited

U.S. PATENT DOCUMENTS

| 4,642,775 | A | * | 2/1987 | Cline et al. ..................... 701/200 |
| 5,340,061 | A | | 8/1994 | Vaquier |
| 5,715,163 | A | * | 2/1998 | Bang et al. ..................... 701/202 |
| 5,797,106 | A | * | 8/1998 | Murray et al. .................. 701/11 |
| 5,884,219 | A | * | 3/1999 | Curtwright et al. ........... 701/213 |
| 6,163,744 | A | * | 12/2000 | Onken et al. ...................... 701/3 |
| 6,389,355 | B1 | | 5/2002 | Gibbs |
| 6,522,958 | B1 | | 2/2003 | Dwyer |
| 6,571,171 | B1 | * | 5/2003 | Pauly ........................... 701/206 |
| 6,618,652 | B2 | * | 9/2003 | Lafon et al. ...................... 701/3 |
| 6,625,537 | B2 | * | 9/2003 | Dwyer .......................... 701/206 |
| 6,633,810 | B1 | | 10/2003 | Qureshi |
| 6,856,864 | B1 | * | 2/2005 | Gibbs et al. ...................... 701/3 |
| 7,089,091 | B2 | * | 8/2006 | Artini et al. ...................... 701/3 |

(Continued)

FOREIGN PATENT DOCUMENTS

| EP | 0 516 501 | | 12/1992 | |
| WO | WO0231795 | * | 4/2002 | ............ G01C 23/00 |
| WO | 2004/102121 | | 11/2004 | |

OTHER PUBLICATIONS

Preliminary Search Report dated Jul. 22, 2008 w/ English translation.

*Primary Examiner* — Russell Frejd
(74) *Attorney, Agent, or Firm* — Dickinson Wright PLLC

(57) ABSTRACT

A method of creating at least one flight plan of an aircraft includes entering a creation objective which illustrates a type and general characteristics of the flight plan to be created, automatically generating a flight plan outline, automatically generating a targeted request for information relating to missing parameters, entering the requested information relating to the missing parameters, and supplementing automatically the flight plan outline and automatically deleting any discontinuities to create, in a definitive manner, the flight plan.

9 Claims, 2 Drawing Sheets

(56) References Cited

U.S. PATENT DOCUMENTS

| | | | |
|---|---|---|---|
| 7,162,335 B2* | 1/2007 | He et al. | 701/206 |
| 7,769,501 B2* | 8/2010 | Lusardi et al. | 701/3 |
| 2006/0259234 A1* | 11/2006 | Flynn et al. | 701/202 |
| 2007/0050098 A1 | 3/2007 | Caillaud | |
| 2007/0129857 A1* | 6/2007 | Fortier | 701/16 |
| 2008/0059058 A1* | 3/2008 | Caillaud et al. | 701/206 |

* cited by examiner

METHOD AND DEVICE FOR CREATING AN AIRCRAFT FLIGHT PLAN

FIELD OF THE INVENTION

The present invention relates to a method and a device for creating an aircraft flight plan, in particular for a transport airplane.

BACKGROUND OF THE RELATED ART

It is known that there generally exist two categories of flight plans on an aircraft, namely:
- an active flight plan which represents the current flight plan which is followed by the aircraft. This current flight plan is in particular taken into account by a flight management system, of FMS type, which assists the aircraft's pilots with flight management and which uses this current flight plan to perform long-term guidance of the aircraft, both in the vertical plane and in the lateral plane. Of course, a single flight plan is active at any one time on the aircraft; and
- secondary flight plans which make it possible in particular to calculate and compare predictions and to anticipate changes of trajectory (for example a change of runway, a diversion, etc.) and which are intended to be able to replace the active flight plan.

A secondary flight plan that might replace an active flight plan can be created during the phase for preparing the flight on the ground. In this case, the pilot merely has to replace the active flight plan with the secondary flight plan, during a flight, in the event of a change of situation so as to then allow the aircraft to follow this now active secondary flight plan. Nevertheless, such ground preparation is not systematic. So, when a secondary flight plan has not been created in advance, its creation during a flight may become irksome. For this purpose, an operator, in particular the pilot, can create this secondary flight plan from scratch, or make a copy of the active flight plan and then carry out the modifications manually. Accordingly, the operator must in particular inquire about the associated procedures and consult the various maps at his disposal, this creating a significant workload.

The standard creation of a secondary flight plan in this way is therefore not very well suited to a flight, during which the pilot must simultaneously manage other tasks such as aircraft guidance, communication, systems management, etc. To these difficulties may be added a context of stress, since the creation of a secondary flight plan is sometimes done in an emergency situation.

It is known that on certain aircraft, there exist secondary flight plans prepared in advance. Generally, these secondary flight plans exhibit a particular caption. These captions are generic and do not convey the purpose sought when these secondary flight plans were created. The pilot is therefore forced to store the modifications which have been made to create these secondary flight plans, thus creating an additional workload and possibly leading to confusion. So, this standard solution existing on certain aircraft is not completely satisfactory.

SUMMARY OF THE INVENTION

The object of the present invention is to remedy the aforesaid drawbacks. It relates to a method allowing a pilot to create, easily and with a reduced workload, in particular during a flight of the aircraft, at least one flight plan, such as an aforesaid secondary flight plan.

For this purpose, according to the invention, said method is noteworthy in that the following series of successive operations is carried out:
a) a creation objective is received from an operator of the aircraft;
b) a flight plan outline is automatically generated on the basis of said creation objective, said outline being devoid of certain parameters which represent missing parameters;
c) the operator is automatically requested, in the form of a tasks guidance, to provide information relating to said missing parameters;
d) the information relating to said missing parameters is received from the operator; and
e) on the basis of said information received and of said outline, said flight plan is automatically created.

Thus, by virtue of the invention, the workload of the operator, in particular of the pilot of the aircraft, is greatly reduced when he wishes to create, in particular during a flight, a flight plan such as a secondary flight plan. Specifically, his workload is then limited to:
- the generation of a creation objective which illustrates the type and the general characteristics of the flight plan that the operator wishes to create; and
- the provision of particular information which is requested from him automatically.

The other steps of the process for creating the flight plan do not therefore require the intervention of the operator and are carried out automatically, namely in particular:
- the generation of a flight plan outline which complies with the creation objective provided by the pilot;
- the requesting of information, which is targeted and carried out in the form of a tasks guidance; and
- the definitive creation of the flight plan on the basis of the outline and of the information received.

Within the framework of the present invention, said creation objective can correspond to one of the following objectives:
- modification of the departure of a flight plan, in particular of the current flight plan;
- modification of the arrival of a flight plan, in particular of the current flight plan;
- return to the airport of origin during a flight;
- flight to a diversion airport;
- preparation of a next flight (in flight or on the ground); and
- change of an ocean route.

Thus, by virtue of the invention, the pilot is able to create an arbitrary secondary flight plan rapidly, easily and with a reduced workload. This makes it possible to remedy the aforesaid drawbacks.

In a preferred embodiment:
- said flight plan is presented to the operator and he is requested to validate it; and
- said flight plan is definitively accepted, only after a validation carried out by the operator.

Preferably, in step b), on the basis of said creation objective, automatically:
- a prerecorded auxiliary flight plan, in particular the current flight plan, is extracted; and
- the parameters and parts which do not correspond to said creation objective are deleted on this auxiliary flight plan so as to form said flight plan outline.

Furthermore, in a particular embodiment, in step c), for at least one missing parameter, various options are proposed automatically to the operator and he is requested automatically to select one of said options, and in step d), the option selected by the operator is received (and will be used to create the flight plan).

Additionally, in an advantageous manner:
said flight plan created in step e) is automatically named with a name which depends on said creation objective; and/or
at least one performance calculation is carried out for the flight plan created in step e).

A possible application of the invention is such that, when an order to change active flight plan is received, the current active flight plan is automatically replaced on the aircraft with the flight plan created in step e).

Additionally, in a particular embodiment, the following operations are carried out, moreover, for a flight plan created in step e), which is defined between a departure airport and an arrival airport:
parameters characterizing an intermediate airport which is situated between said departure airport and said arrival airport are received. These parameters can, in particular, relate to the length of time that the aircraft will spend on the ground at the intermediate airport, the quantity of fuel which will be consumed during this phase (comprising a landing and a further takeoff), and any scheduled changes of weight;
these parameters are inserted into said flight plan; and
predictions are calculated on the whole of said flight plan, by taking account of said (inserted) parameters relating to said intermediate airport.

Thus, by virtue of the invention, it is possible to define, in a single flight plan, an intermediate airport, without calling upon a complex structure which would involve several flight plans and which would limit and above all would render more complex the possibilities offered to the crew for defining the flight plan. The management of the single flight plan thus obtained affords the crew a better representation of their flight and helps to considerably decrease their workload throughout the duration of the flight.

The present invention also relates to a device for creating at least one flight plan of an aircraft, in particular of a transport airplane.

According to the invention, said device is noteworthy in that it comprises:
means allowing an operator of the aircraft to enter a creation objective;
means for automatically generating a flight plan outline on the basis of said creation objective entered, said outline being devoid of certain parameters which represent missing parameters;
means for automatically asking the operator, in the form of a tasks guidance, to provide information relating to said missing parameters;
means allowing the operator to enter the information relating to said missing parameters; and
means for automatically creating said flight plan on the basis of said information entered and of said outline.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
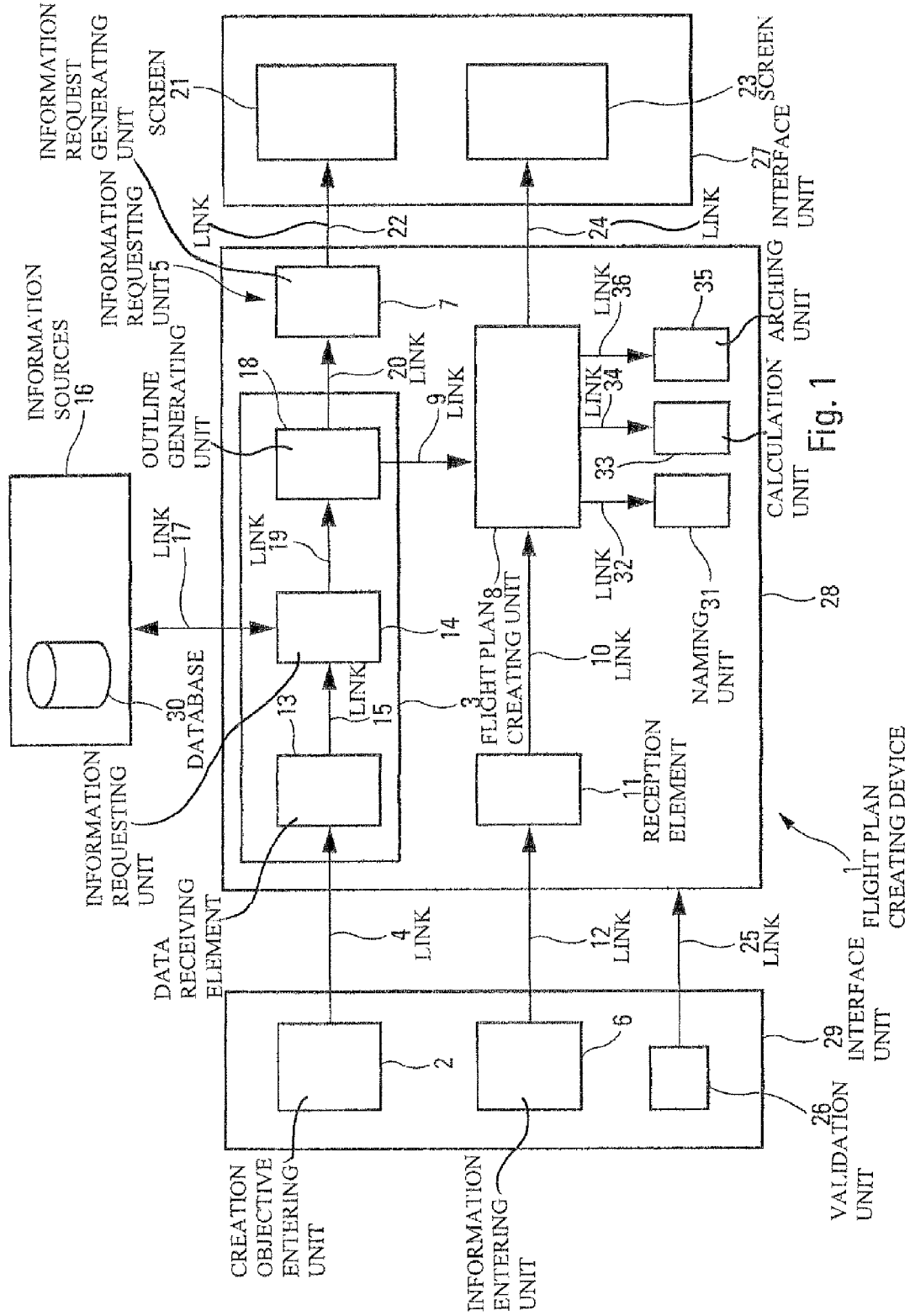
FIG. 1 is the schematic diagram of a flight plan creation device in accordance with the invention.

The device 1 in accordance with the invention and schematically represented in FIG. 1 is intended to create at least one flight plan, in particular a secondary flight plan, of an aircraft and in particular of a transport airplane (civil or military).

It is known that the lateral part of a flight plan comprises, in addition to waypoints along the whole flight, information relating to departure and destination. Concerning the departure airport, the pilot must indicate the following three parameters: the takeoff runway, the departure procedure (SID) and a transition parameter (TRANS) which specifies the transition trajectory between the departure procedure and the climb phase. For the arrival airport, the pilot must indicate the landing runway, the arrival procedure, the approach, a transition parameter of type TRANS, and a transition parameter of type VIA. Moreover, one or more alternate airports are associated with the arrival airport, just one of these alternate airports being active. It represents the airport to which the aircraft must divert if the initially scheduled airport is not available.

Furthermore, the vertical part of a flight plan (or vertical flight plan) contains all the information necessary to calculate the predictions regarding altitude, speed and time. There are four types of information relating to the vertical flight plan:
general information:
a cost index;
a cruising level and a cruising temperature;
data relating to fuel and to loading;
data relating to a flight phase:
configuration of the takeoff thrust;
thrust reduction altitudes and acceleration altitudes;
climb, cruising, descent and approach speeds;
pressure and temperature at destination;
vertical constraints such as speed, altitude, time, and climb and descent levels; and
wind-related data.

According to the invention, said device 1 comprises:
means 2 specified below, which allow an operator, in particular a pilot of the aircraft, to enter a creation objective. Within the framework of the present invention, it is considered that a creation objective illustrates the pilot's intention as regards the type of flight plan that he wishes to create or the type of modification(s) that he envisages carrying out on an existing flight plan;
means 3 which are connected by way of a link 4 to said means 2 and which are formed so as to automatically generate a flight plan outline, on the basis of the creation objective entered by the operator with the aid of said means 2. Within the framework of the present invention, said flight plan outline represents a flight plan which is created only in a partial manner and which is devoid of certain parameters (specified below) which will be called missing parameters hereinafter;
means 5 for automatically asking the operator, in the form of a tasks guidance, to provide information relating to said missing parameters;
means 6 which allow the operator to enter the information requested automatically, relating to said missing parameters; and
means 8 which are connected by way of links 9 and 10 respectively to said means 3 and to a reception element 11 (which is connected by way of a link 12 to said means 6 and which receives the information entered by the operator). These means 8 are formed so as to automatically create said flight plan, on the basis of the information entered by the operator and of the flight plan outline, received from said means 3.

To form said outline, said means 3 comprise:
- an element 13 for receiving data, which receives (via the link 4) the data entered by way of the means 2;
- means 14 which are connected by way of a link 15 to said element 13 and which automatically request information from external information sources 16, to which they are connected by way of a link 17; and
- means 18 which are connected by way of a link 19 to said means 14 and which automatically generate said outline on the basis of the information transmitted by said information sources 16 (via the link 17, the means 14 and the link 19).

Furthermore, said means 5 comprise:
- means 7 which are connected by way of a link 20 to said means 18 and which automatically generate at least one information request, specified below; and
- a viewing screen 21 making it possible to present this request for information to the operator, which is received via a link 22.

Said device 1 moreover comprises, as represented in FIG. 1:
- a viewing screen 23 which is connected by way of a link 24 to said means 8 and which is able to display the flight plan created by these means 8; and
- a validation means 26 which allows an operator to validate (via a link 25) a created flight plan.

Additionally, in a preferred embodiment:
- said screens 21 and 23 correspond to one and the same screen and form part of a single display unit 27;
- said means 2, 6 and 26 form part of one and the same unit 29 making it possible to enter data and corresponding for example to a keyboard and/or a standard designator;
- said units 27 and 29 correspond to one and the same man/machine interface unit; and
- said means 3, 7, 8 and 11 form part of one and the same computer 28, for example a flight management system, of FMS type.

Thus, by virtue of the device 1, the workload of the operator, in particular of the pilot of the aircraft, is greatly reduced when he wishes to create, in particular during a flight, a flight plan such as a secondary flight plan. Specifically, his workload is then limited to:
- the generation (with the aid of the means 2) of a creation objective which illustrates the type and the general characteristics of the flight plan that he wishes to create;
- the provision (with the aid of the means 6) of particular information which is requested from him automatically; and
- optionally, a validation (with the aid of the validation means 26).

The other steps of the process for creating the flight plan do not therefore require the intervention of the operator and are carried out automatically, namely in particular:
- the generation (by the means 3) of a flight plan outline which complies with the creation objective provided by the pilot;
- the requesting (by the means 5) of information, which is targeted and carried out in the form of a tasks guidance; and
- the definitive creation of the flight plan (by the means 8) on the basis of the outline and of the information received.

Within the framework of the present invention, said creation objective can in particular correspond to one of the following objectives:
- modification of the departure of a flight plan, in particular of the current flight plan;
- modification of the arrival of a flight plan, in particular of the current flight plan;
- return to the airport of origin during a flight;
- flight to a diversion airport;
- preparation of a next flight (in flight or on the ground); and
- change of an ocean route.

Thus, by virtue of the device 1, the pilot is able to create any (secondary) flight plan rapidly, easily and with a reduced workload, doing so during a flight or on the ground.

In a preferred embodiment, said means 14 automatically extract from a database 30 forming part of said information sources 16 a prerecorded auxiliary flight plan, in particular the current flight plan, and said means 18 delete on this auxiliary flight plan the parameters and the parts which do not correspond to said creation objective so as to form said flight plan outline.

Furthermore, in a particular embodiment, said means 5 propose various options to the operator on the screen 21 and request him automatically to select one of these various options by way of the means 6. The various options selected are thereafter used by the means 8 to create the definitive flight plan.

Additionally, in a particular embodiment, said device 1 comprises, moreover, the following means which are for example integrated into the computer 28:
- means 31 which are connected by way of a link 32 to said means 8 and which are formed so as to automatically name a created flight plan, doing so with a name which depends on the creation objective entered by the operator, as specified below. In a preferred embodiment, the name contains the skeleton of the flight plan (departure, destination, significant waypoints), as well as the modification which has been made with respect to the active flight plan;
- calculation means 33 which are connected by way of a link 34 to said means 8 and which are formed so as to automatically carry out standard performance calculations for the flight plan created by the means 8; and
- archiving (or filing) means 35 which are connected by way of a link 36 to said means 8 and which are intended to file away a created flight plan.

The device 1 in accordance with the invention therefore ensures assistance (relying on tasks guidance and automation) with the creation of any flight plan, as a function of the pilot's intention, explicitly filled in by the latter by virtue of the means 2. Said device 1 proposes various creation options, corresponding to the possible objectives that the crew may have in mind in the various situations to envisage a change of trajectory.

As a function of the objective indicated by the pilot and of the current situation, or indeed of the ongoing active flight plan, the device 1 may be required to create this new flight plan on the basis of a copy of an existing flight plan, by modifying the relevant parts thereof, or by a creation ex-nihilo.

Consequently, according to the invention, to accelerate the task of the crew, once the creation objective has been indicated, the device 1 creates the new flight plan by automatically performing certain actions such as:
- when created on the basis of an existing flight plan, automatic deletion of those parts of the flight plan that might be required to be modified;
- automatic filling in of certain parameters of the flight plan, as a function of the current situation (current position, current trajectory, etc.) and of the creation objective indicated by the pilot;

assistance to the pilot when he is required to select parameters (if necessary), by offering him the various options which may arise, or by inviting him to fill in missing fields;

name the flight plan thus initiated with a default name arising from the objective indicated by the pilot; and archiving the flight plans created so that the pilot comprehends, easily and rapidly, the objective and the situation for which each flight plan has been created.

The device 1 also makes it possible to classify the various existing flight plans in a system such as the flight management system, as a function of the day's flights, and to facilitate transfers of the flight plans in the event of a change of crew.

During the creation of a flight plan, the device 1 must gather information concerning the pilot's intention (illustrated by the creation objective), such as a runway, an airport, etc. This information can be gathered in various ways:

in a basic embodiment, the device 1 proposes only information contained in a standard database of the flight management system (FMS system): airports, runways, procedures. The pilot is invited to successively select the various parameters in this database, for example the aforesaid database 30;

in a preferred embodiment, the device 1 can use information originating from the "open world" (database specific to the airline, forming for example part of the aforesaid sources 16) so as to restrict and/or widen the proposals made to the pilot as a function of the current situation. For example, a prior calculation of landing performance or (as the case may be) takeoff performance can provide a preselection of the appropriate runways;

the flight plans sometimes require results of performance calculations (takeoff speeds, runway lengths necessary for takeoff or landing, etc.), on the basis of data such as the aerodynamic configuration at takeoff or landing (configuration of slats, flaps, weight, center of gravity, etc.) of the airplane, or of the state of the runway. In a preferred embodiment, the FMS system automatically dispatches the updated data to the performance calculation model which returns the results of the calculation. The pilot need only validate the result of the calculation. However, if the architecture does not allow such a communication, the device 1 invites the pilot to perform the performance calculation (by hand or with a portable computer) and to fill in the results;

in a preferred embodiment, a certain number of auxiliary flight plans, in particular secondary ones, are already prepared in advance by the airline and contained in the electronic flight documentation (forming for example part of the aforesaid sources 16). These flight plans are digitized and accessible to the device 1. As a function of the pilot's intention, the device 1 can load such a flight plan from the electronic documentation with the aim of modifying it;

in a preferred embodiment, the device 1 has at its disposal the diversion airfields filled in the flight folder as a function of the flight segment. As a function of the creation objective, entered by the pilot, the device 1 then proposes the airport or airports that are most suitable when creating the new flight plan.

As a function of the element of the flight plan to be modified (runway, SID, destination, etc.), the device 1 makes a copy of the active flight plan (with the aid of the means 14), modifies the necessary parameters and automatically erases the irrelevant part (with the aid of the means 18). The pilot is thereafter invited by explicit wording (presented on the screen 21) to select successively (with the aid of the means 6) any complementary parameters, in accordance with one or more of the following options:

the pilot selects the parameter graphically, that is to say by designating a graphical object depicting the parameter;

the pilot selects the parameter on the basis of a list of choices;

the pilot selects the parameter by directly feeding in his identifier.

Once all the parameters have been input, the device 1 constructs the flight plan (means 8) and proposes verification of the associated performance. The pilot is thereafter required to validate this flight plan (with the aid of the validation means 26).

We shall describe hereinafter (paragraphs A to H) various flight plans that might be created by the device 1 in accordance with the invention, on the basis of modifications of initial flight plans, in accordance with a creation objective entered by an operator.

A. Modification of the Departure of a Flight Plan

This option makes it possible to rapidly create a flight plan containing a new departure. At the implementation level, it consists in modifying the part relating to the departure on the active flight plan, as well as in instigating the updating of the calculations of the takeoff performance (compatibility of the aircraft's performance having regard to its weight, its center of gravity and the runway length, calculation of the characteristic speeds, etc.).

In a standard manner, through an FMS system, a departure is composed of successive components (not all are compulsory): the runway, the departure procedure (SID), the transition between the two (TRANS). These last two parameters are composed of one or more elementary flight segments based for example on waypoints.

By selecting this option, the previously input departure is automatically deleted from the flight plan (by the means 18). Additionally, there is a discontinuity between the departure airport and the first points of the climb. The following flight plan is then obtained:

elements identical to those of the active flight plan (and therefore not deleted by the means 18):
  airport of origin;
  route point;
  a flight level;
  destination airport and optional elements of the approach;
elements to be supplemented (with the aid of the means 6):
  a takeoff shift parameter;
  characteristic speeds VR V1, V2;
  SID;
  TRANS.

The pilot is thereafter invited, by a tasks guidance implemented by the means 5, to select successively (with the aid of the means 6) the various parameters of the new departure:

the runway selected by default, indicated by the device 1, is the runway of origin. If the pilot desires to change runway, he can select the new runway graphically on an aerodrome map or in a textual manner from a list. The takeoff shift parameter is that of the selected runway;

the SID procedure associated with the selected runway can be selected, in the same manner, graphically on a map or from a list; and the transition parameter TRANS if necessary.

Once the departure has been input, the means 8 of the device 1 supplement the flight plan and automatically delete the discontinuity between the last element of the departure procedure and the first element of the part en route.

In a variant, the tasks guidance (means 5) thereafter proposes an accessway to the performance calculation once the flight plan has been created. The parameters relating to the weather (wind, temperature, QNH, etc.) and the load parameters (takeoff weight TOW and takeoff center of gravity TOCG")] are identical to those used for the performance calculation on takeoff of the active flight plan. In a preferred embodiment, the device 1 dispatches the new runway directly to the performance calculation system, for example the means 33. However, in the case where the architecture does not allow such communications, the device 1 can invite the pilot to instigate a new performance calculation and then to fill in these parameters.

When he is satisfied with the flight plan created and with the associated performance, the pilot validates it (with the aid of the validation means 26) and this flight plan is archived (by the archiving means 35).

During creation, as soon as the runway of the new flight plan is filled in, the latter appears in the list of secondary flight plans, with its characteristics (name and time of creation), and it is ready to be exchanged with the active flight plan.

The default name of this flight plan is: "DEP XXXX YYY [Opt1] [Opt2]", where:
  XXXX is the ICAO code of the departure airport;
  YYY is the last runway selected;
  Opt1 and Opt2 are the optional complementary elements (SID and/or TRANS), if they are different from those of the active flight plan; and
  the time of creation is that when the creation process is instigated.

B. Modification of the Arrival of a Flight Plan

This option makes it possible to modify the part relating to the arrival of the active flight plan, and to update landing performance calculations.

The other elements of the flight plan (origin, departure procedure, flight level, etc.) are reused unchanged.

In a standard manner, through an FMS system, an arrival is composed of successive components (not all are compulsory): the runway, the type of approach on this runway (ILS, VOR, by sight, etc.), the arrival procedure (STAR), the transition between the two (VIA), and the transition with the en route part of the FMS system (TRANS). All, except the first parameter, are composed of one or more elementary flight segments based for example on waypoints.

The following flight plan is then obtained:
  elements of the flight plan which are identical to those of the active flight plan (and which are not deleted by the means 18):
    a route point(s);
    flight level(s);
    airport of origin, and any departure elements;
    meteorology elements (wind and temperature) at the various common route points;
    arrival airport;
  elements which are different and which have to be supplemented (with the aid of the means 6):
    landing runway;
    approach;
    STAR;
    VIA;
    TRANS.

The principle of creation is similar to the aforesaid option A, but transposed to arrival. The pilot is invited with the aid of the means 5, by a tasks guidance, to select successively (using the means 6) the various parameters of the new arrival:
  the runway selected by default is the landing runway of the active flight plan. If the pilot desires to change runway, he can select the new runway graphically on an aerodrome map or in a textual manner from a list;
  the final approach associated with the selected runway;
  the parameter VIA if necessary;
  the procedure STAR can be selected graphically on a map or from a list; and
  the transition parameter TRANS if necessary.

Once all these parameters have been filled in, the means 8 of the device 1 supplement the flight plan and automatically delete any discontinuities.

The tasks guidance thereafter proposes an accessway to the landing performance calculation, once the flight plan has been created. The parameters relating to the weather (wind, temperature, QNH, etc.) and the weight/center of gravity parameters are identical to those used for the performance calculation on arrival of the active flight plan. By default, the landing parameters (type of approach, gradient) are identical. In a preferred embodiment, the device 1 dispatches the new runway directly to the performance calculation system, for example the means 33. However, in the case where the architecture does not allow such communications, the device 1 can invite the pilot to instigate a new landing performance calculation, which will be performed by hand or with a portable computer.

When he is satisfied with the flight plan created and with the associated performance, the pilot validates it with the aid of the validation means 26, and this flight plan is archived (by the archiving means 35).

During creation, as soon as the runway (even if it is unchanged) of the flight plan is filled in, the latter appears in the list of secondary flight plans, with its characteristics (name and time of creation) and it is ready to be exchanged with the active flight plan.

The default name of this flight plan is: "ARR XXXX YYY [Opt1] [Opt2]", where:
  XXXX is the ICAO code of the destination airport;
  YYY is the last runway selected;
  Opt1 and Opt2 are the optional complementary elements (STAR and/or VIA), if they are different from those of the active flight plan; and
  the time of creation is that when the creation process is instigated.

C. Return to the Airport of Origin During a Flight

This option makes it possible to construct a return trajectory to the departure airport. This option is available to the pilot only from the climb phase. If this option is selected, the device 1 makes a copy of the points flown in the previous active flight plan and automatically carries out a lateral revision.

The following flight plan is then obtained:
  elements of the flight plan which are identical to those of the active flight plan:
    a en route elements;
    flight level;
    arrival airport;
    landing runway;
  elements which are different and which have to be supplemented (with the aid of the means 6):
    approach;
    VIA;
    STAR;
    TRANS.

Initially, the device 1 proposes selection of the point from which the change of trajectory will be performed. This point can be:
  the current position. In this case, the return to the departure airport is effected as soon as the flight plan is activated.

In this case, the device 1 creates a blank flight plan and fills in the destination together with the departure airport; or another point of the flight plan in the event of deferred return. In this case, the device 1 makes a copy of the active flight plan and carries out a revision of "new destination" type from the selected point. This amounts to automatically deleting all the points from the selected point onwards, to creating a discontinuity between the point and the destination, and to modifying the destination together with the departure airport.

The device 1 thereafter proposes selection of the various parameters relating to arrival and instigates a tasks guidance similar to that carried out for the aforesaid option B. If the pilot fills nothing in, a final approach and an automatic preselection of the most efficacious navigation means available on the runway (ILS for example) are proposed by default. The runway filled in by default is that used (or scheduled to be used) on takeoff.

The default name of this flight plan is: "BACK TO XXXX", where:
  XXXX is the ICAO code of the departure airport; and
  the time of creation is that when the creation process is instigated.

D. Flight to a Diversion Airport

This option makes it possible to construct a route to a diversion airport, following a fault or any deteriorating situation. Often, pilots leave without having prepared any emergency airfields. In a preferred embodiment, the electronic flight documentation (specific database) interfaced with the FMS system already contains the diversion airfields advocated by the airline.

In a basic embodiment, when the device 1 does not have at its disposal the diversion airports preferred by the airline, it sorts the closest airports as a function of various criteria presented to the crew:
  the flight distance and/or time calculated in real time by the FMS system. A certain number (parametrizable) of airfields are presented in increasing flight distance and/or time;
  the runway length, known by the FMS system. In a subvariant, only the airports proposing runways suited to the landing performance are proposed, or then they are highlighted.

The pilot is then invited to select (by the means 6) an airfield if there are several. Through specific highlighting (for example a color code), the pilot very rapidly visualizes which airfields are accessible. The device 1 creates a blank flight plan and fills in the destination as a function of the pilot's choice.

In a preferred embodiment, the trajectory automatically proposed by default (before modifications by the operator) for meeting the new airfield can consist either of a direct trajectory to the diversion airfield, or of a trajectory initially parallel to the original route, but shifted by a few nautical miles, thereafter meeting the airfield at the point closest to this shifted trajectory (through a 90° turn). Additionally, the choice of trajectory and the value of the lateral shift can be parameterized in advance by the company and even modified by the pilot before or during the creation of the secondary flight plan.

In an intermediate embodiment, the electronic flight folder EFF interfaced with the FMS system contains only the diversion airfields assigned to each part of the active flight plan (in progress). The device 1 then creates a flight plan with a direct trajectory to the destination which is advocated in the EFF folder (which can form part of the aforesaid sources 16) and optionally invites the pilot to select an airfield from a list if there are several.

Furthermore, in a preferred embodiment, the EFF folder, interfaced with the FMS system, already contains sketches of secondary flight plans to emergency airfields, compatible with the current situation, comprising the destination airport and the route to get there. The one then proposed first by the device 1 is that which is best suited to the current position of the airplane, by default selection from a list of trajectories.

The tasks guidance thereafter makes it possible to prepare the arrival and the necessary parameters (similar to the tasks guidance of the previous option B).

As soon as the diversion airport is filled in, this flight plan appears in the list of secondary flight plans with its characteristics (name and time of creation) and it is ready to be exchanged with the active flight plan.

The default name of this flight plan is: "DIVERT TO XXXX", where:
  XXXX is the ICAO code of the diversion airport; and
  the time of creation is that when the creation process is instigated.

E. Preparation of a Next Flight Plan

This option makes it possible to create a flight plan which will be initiated from the current destination airport. This option comes within the framework of integrated mission preparation, where the documentation provided by the airline may contain all the day's flights. The crew can thus prepare, one by one, the following flights. After having created a blank flight plan, the device 1 makes it possible to select the departure and arrival airports from the list of stops scheduled during the day (if they are available in the electronic documentation). By default, the departure airport is the arrival airport of the flight in progress. This option helps to facilitate and reduce the time needed for preparing flights, between the flights, and therefore to decrease the transit time.

As soon as the destination airport is filled in, this flight plan appears in the list of secondary flight plans with its characteristics (name and time of creation) and it is ready to be exchanged with the active flight plan.

The default name of this flight plan is: "XXXX-YYYY", where:
  XXXX is the ICAO code of the destination airport of the current active flight plan;
  YYYY is the ICAO code of the destination airport of the new flight plan; and
  the time of creation is that when the creation process is instigated.

F. Copy

This option makes it possible to copy one of the existing flight plans as backup before a significant modification. This flight plan is thereafter modifiable at will, as is the case for all the secondary flight plans created.

As soon as it is created, this flight plan appears in the list of secondary flight plans with its characteristics (name and time of creation) and it is ready to be exchanged with the active flight plan.

The default name of this flight plan is: "COPY NNNN", where:
  NNNN is the name of the flight plan; and
  the time of creation is that when the creation process is instigated.

G. Change of an Ocean Route

This option makes it possible to select another ocean route from that already programmed. The ocean routes are defined (point by point) each day so as to overfly the oceans. The ocean route allocated to the aircraft can be modified while climbing for various reasons (weather, etc.).

By assumption, the ocean routes existing at the time of the flight are stored in an onboard memory, for example in the electronic flight folder (EFF). Following the activation of the function, the device 1 makes a copy of the active flight plan, inserts the new ocean route and deletes the part of the flight plan relating to the former route, possibly creating discontinuities at the start and at the end of the new route.

The tasks guidance thereafter makes it possible to:
select the new ocean route, graphically or by selection from a list. The discontinuity can thereafter, in a variant, be replaced with the various segments of the new ocean route;
fill in the first cruising level: the tasks guidance proposes the level of the active flight plan by default, but the crew can modify it; and
fill in the Mach number: the tasks guidance proposes the value of the active flight plan by default, but the crew can also modify it.

As soon as it is created, this flight plan appears in the list of secondary flight plans with its characteristics (name and time of creation) and is ready to be exchanged with the active flight plan.

The default name of this flight plan is: "NEW TRACK X", where:
X is the name of the new ocean route (with a blank, if undefined, in particular on creation); and
the time of creation is that when the creation process is instigated.

H. New Draft

This option makes it possible to create a flight plan from scratch.

As soon as it is created, this flight plan appears in the list of secondary flight plans with its characteristics (name and time of creation) and is ready to be exchanged with the active flight plan.

The default name of this flight plan is: "DRAFT 1". It becomes "XXXX-YYYY", as soon as the origin and the destination are filled in, where:
XXXX is the ICAO code of the airport of origin;
YYYY is the ICAO code of the destination airport; and
the time of creation is that when the creation process is instigated.

After their creation, the flight plans can be filed (by the archiving means 35), by time of creation, for example the most recent at the top of the list.

In a particular embodiment, the device 1 comprises, moreover, elements (not represented) allowing the pilot:
to customize the flight plans and change their name. In this case, the modifications are highlighted; and
to select any of these flight plans so as to consult or modify the various elements thereof.

Additionally, in a particular embodiment, said device 1 in accordance with the invention comprises:
means, forming for example part of the unit 29, allowing an operator to enter parameters which characterize an intermediate airport AI which is situated between the departure airport (or airport of origin) AO and the arrival airport (or airport of destination) AD of a created flight plan;
means, for example said means 8, for inserting these parameters into said flight plan; and
means, for example said means 33, for calculating the predictions on the whole of said flight plan, by taking account of said parameters relating to said intermediate airport AI.

This particular embodiment makes it possible to define, in a single flight plan, an intermediate airport AI, without calling upon a complex structure which would involve several flight plans, and which would limit and above all would render more complex the possibilities offered to the crew for defining the flight plan. The management of the single flight plan thus obtained affords the crew a better representation of their flight and helps to considerably decrease their workload throughout the duration of the flight.

Figure 2:
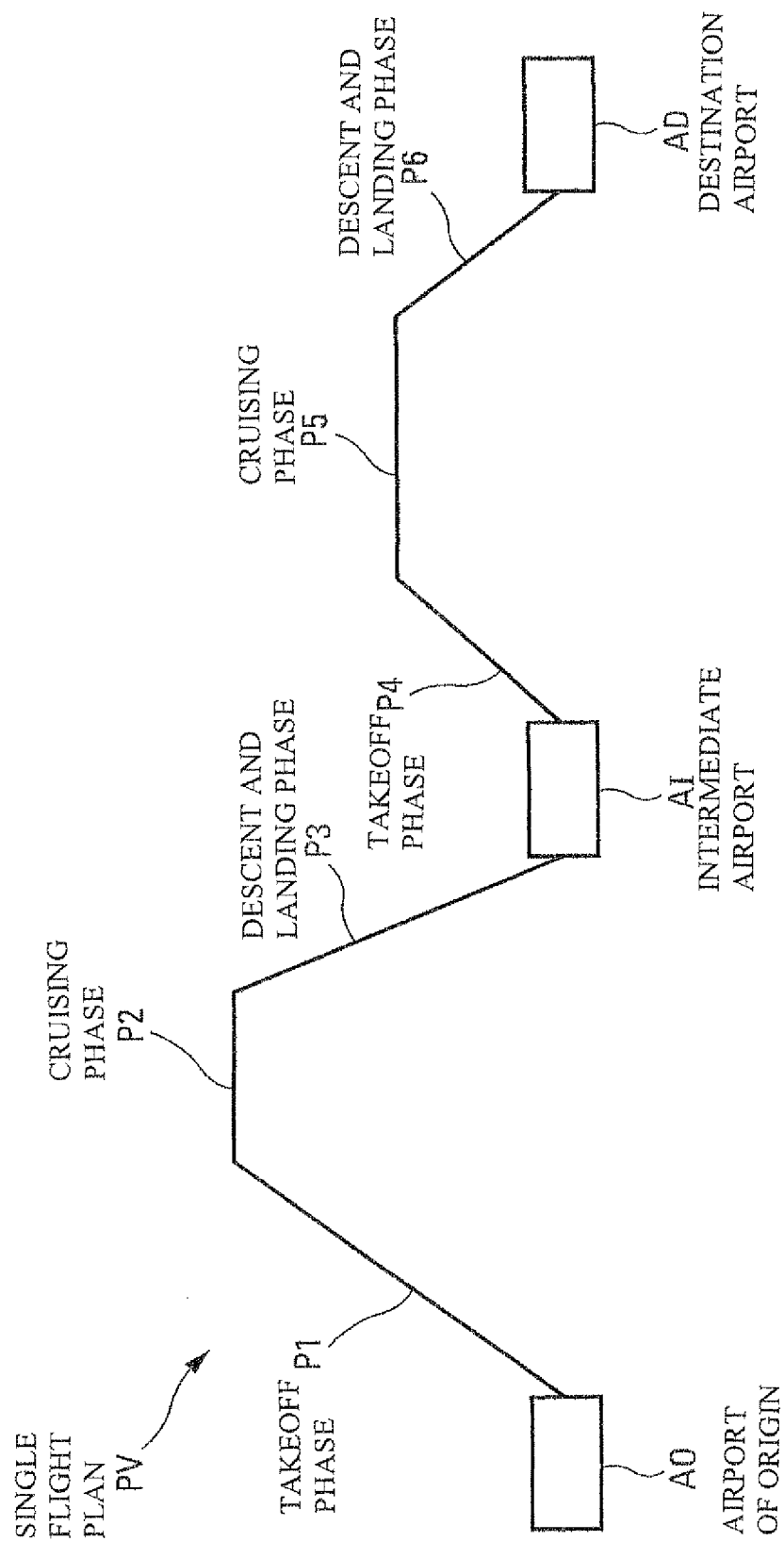
FIG. 2 is a graphic illustrating the main phases of a flight plan into which an intermediate airport has been introduced, in accordance with a particular embodiment of the present invention.

A single flight plan PV is thus obtained, such as represented by way of illustration in FIG. 2, which is defined from the airport of origin AO to the destination airport AD. Between these origin and destination airports, there exists in particular:
a phase P1 of takeoff (from the airport of origin AO) and climb;
a phase P2 of cruising;
a phase P3 of descent and landing (on the intermediate airport AI);
a phase P4 of takeoff (from the intermediate airport AI) and climb;
a phase P5 of cruising; and
a phase P6 of descent and landing (on the destination airport AD).

Once the intermediate airport AI has been inserted into the flight plan, the predictions from the airport of origin AO to the destination airport AD take account of the parameters entered by the crew, in particular the change of weight forecasts (loading and/or unloading of the hold, and/or refueling on the ground), the length of time spent on the ground and the fuel consumed during this phase.

This particular embodiment allows the crew to have all the information necessary to accomplish their mission, which information is defined on one single medium. All the information of the mission is filled in, compiled and accessible from this medium. All the procedures, weight variations and time constraints are filled in before takeoff from the airport of origin AO to the final destination, passing via the intermediate landing AI. The mission is represented in its entirety to the crew. The crew can thus more readily anticipate situations that are abnormal with respect to the complete mission. Preparation being complete from the start to the end of the mission, the crew will be able to concentrate on any hazards related to the mission.

This particular embodiment therefore allows calculation of the predictions over the whole of the flight plan which takes this intermediate airport AI into account. The insertion of the procedures for landing and takeoff at this airport AI, as well as the definition of the weight variations and the time spent on the ground at this airport AI, allow the crew, via the flight management system in particular, to optimize the management of weights and consumptions over the complete flight.

Furthermore, the use of this particular embodiment on a military airplane makes it possible to rapidly insert a tactical landing into a flight plan and to program changes of weight (for example embarking and/or disembarking of troops and/or of freight) and of fuel (uptake of fuel) so as to obtain valid predictions over the whole of the flight plan. The management of a single flight plan (from AO to AD) instead of two different flight plans (from AO to AI and from AI to AD) lightens the workload of the crew (no need to load/define another flight plan during the tactical landing, which may be very quick in the event of combat) and affords them a better overall view of the mission.

The additional benefit of this particular embodiment for military airplanes is the ability to insert simplified procedures for landing and takeoff at this airport AI which is not necessarily a referenced ICAO airport. These simplified procedures are constructed geographically and may be applicable to any airport without the support of a navigation database. All the functions applicable to the conventional departure and arrival procedures (at an ICAO airport with procedures defined in the navigation database) are nevertheless also applicable, since the intermediate airport AI may also be defined as a civil airport.

This particular embodiment can also be used on a civil airplane which makes regular "shuttle"-type flights between two airports, or during a stopover for a long-haul flight.

The invention claimed is:

1. A method for creating a secondary flight plan based on an objective for modifying a current flight plan, the method comprising the steps of:
   entering, into an entering unit, an objective for creating the secondary flight plan, wherein the objective is based on one of the following objectives:
      i) modifying a departure flight plan,
      ii) modifying of an arrival flight plan,
      iii) providing a return flight plan to point of origin,
      iv) providing a flight plan for a diversion airport,
      v) providing a next flight plan, and
      vi) providing a change for an ocean route;
   extracting from a database the current flight plan;
   generating a flight plan outline, wherein the flight plan outline is generated by an outline generating unit, which generates the flight plan outline by deleting parameters of the extracted current flight plan based on parameters of the objective entered into the entering unit;
   requesting, by a requesting unit, information relating to the parameters deleted by the outline generating unit, wherein the request is displayed on a first viewing screen in the form of tasks guidance in which a plurality of options based on the deleted parameters are proposed on the first viewing screen, and the request is to select one of the proposed options;
   entering, into an information entering unit, one of the options proposed by the requesting unit;
   creating the secondary flight plan, by a flight plan creating unit, wherein the flight plan creating unit creates the secondary flight plan by filling in the deleted parameters of the flight plan outline, based on the option entered into the information entering unit; and
   displaying the secondary flight plan on a second viewing screen, wherein the first viewing screen and the second viewing screen are the same viewing screen or are different viewing screens.

2. The method as claimed in claim 1, wherein the secondary flight plan is validated by an operator through a validation unit.

3. The method as claimed in claim 1, wherein the secondary flight plan is presented on the second viewing screen and the second viewing screen is different from the first viewing screen.

4. The method as claimed in claim 1, wherein the secondary flight plan is named, by a naming unit, based on the objective for creating the secondary flight plan.

5. The method as claimed in claim 1, wherein a performance calculation for the secondary flight plan is carried out by a calculation unit.

6. The method as claimed in claim 1, wherein the secondary flight plan is stored in an archiving unit.

7. The method as claimed in claim 1, wherein the current flight plan is extracted from a database of information sources.

8. The method as claimed in claim 7, wherein the database of information sources is comprised of a database of a flight management system.

9. The method as claimed in claim 7, wherein the database of information sources is comprised of a database of open world information sources.

* * * * *